US006859584B2

(12) United States Patent
Johnson et al.

(10) Patent No.: US 6,859,584 B2
(45) Date of Patent: Feb. 22, 2005

(54) METHODS AND APPARATUSES FOR BONDING IN ATHERMAL OPTICAL FIBER PACKAGES

(75) Inventors: Alan E. Johnson, San Jose, CA (US); Frank D. Braun, San Jose, CA (US); Edward P. Donlon, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/335,629

(22) Filed: Dec. 31, 2002

(65) Prior Publication Data

US 2004/0126060 A1 Jul. 1, 2004

(51) Int. Cl.[7] .................................................. G02B 6/34
(52) U.S. Cl. ............................ 385/37; 385/49; 385/52
(58) Field of Search ............................. 385/37, 31, 49, 385/52, 88, 92, 98, 136, 138

(56) References Cited

U.S. PATENT DOCUMENTS

| | | | |
|---|---|---|---|
| 4,185,883 A | | 1/1980 | Chown et al. |
| 4,919,509 A | * | 4/1990 | Miller et al. ................... 385/55 |
| 5,305,406 A | | 4/1994 | Rondeau |
| 5,822,483 A | | 10/1998 | Rondeau |
| 5,940,558 A | * | 8/1999 | Bishop et al. ................. 385/52 |
| 6,000,857 A | | 12/1999 | Rondeau |
| 6,074,101 A | | 6/2000 | Bloom |
| 6,220,766 B1 | * | 4/2001 | Yeandle et al. ................ 385/94 |
| 6,282,340 B1 | | 8/2001 | Nasu et al. |
| 6,327,405 B1 | | 12/2001 | Leyva et al. |
| 6,520,689 B2 | * | 2/2003 | DeMartino et al. ............ 385/98 |
| 6,536,958 B2 | * | 3/2003 | Liu ............................... 385/92 |
| 6,576,165 B2 | * | 6/2003 | Aloisio et al. ............. 264/1.25 |
| 2003/0081930 A1 | * | 5/2003 | Filhaber et al. ............. 385/147 |
| 2003/0108288 A1 | * | 6/2003 | Bulman et al. ................ 385/37 |

FOREIGN PATENT DOCUMENTS

| | | | |
|---|---|---|---|
| EP | 0 576 850 A1 | 1/1994 | |
| EP | 1 081 881 A2 | 3/2001 | |
| JP | 2003307653 A | * 10/2003 | ............ G02B/6/00 |
| WO | 03/39915 | 6/2004 | |

OTHER PUBLICATIONS

Yoffe, G.W. et al, "Passive temperture–compensating package for optical fiber gratings", Applied Optics, Optical Society of America, Washington, US, vol. 34, No. 30, Oct. 20, 1995, pp. 6859–6861.

\* cited by examiner

*Primary Examiner*—Karl D. Frech
*Assistant Examiner*—Uyen-Chau N. Le
(74) *Attorney, Agent, or Firm*—Blakely, Sokoloff, Taylor & Zafman LLP

(57) ABSTRACT

An athermal package for fiber photonic devices includes a ferrule to attach the optical fiber to the package. The ferrule has an opening to receive the optical fiber. The ferule is collapsed to attach the optical fiber to the athermal package. Alternatively, the athermal package uses adhesive bonds disposed in pockets of the package. The pockets have a narrow end and a wide end, with the narrow ends facing each other. The adhesive bonds are disposed in the pockets in contact the narrow ends of the pockets but not with the wide ends. The narrow ends physically confine the adhesive bonds so that if the bonds expand or contract due to environmental conditions (or the curing process), the adhesive either expands or contracts near the wide ends of the pockets. This allows the strain on the optical fiber segment between the bonds to remain substantially constant.

15 Claims, 4 Drawing Sheets

METHODS AND APPARATUSES FOR BONDING IN ATHERMAL OPTICAL FIBER PACKAGES

FIELD OF THE INVENTION

Embodiments of invention relate generally to fiber photonic devices and, more specifically but not exclusively relate to packages for fiber photonic devices.

BACKGROUND INFORMATION

An optical transmission system transmits information from one place to another by way of a carrier whose frequency is in the visible or near-infrared region of the electromagnetic spectrum. A carrier with such a high frequency is sometimes referred to as an optical signal, an optical carrier, or a lightwave signal. Such optical signals are commonly propagated in optical fibers.

In some systems, photonic devices are built into or include a segment of optical fiber. For example, a Bragg grating can be implemented in a segment of optical fiber by forming regions of periodically alternating refractive indices in the fiber segment through which an optical signal is propagated. This type of Bragg grating is commonly referred to as a fiber Bragg grating (FBG) and is typically used as a wavelength selective filter in fiber optic communication systems. For example, the FBG can be used to filter out a particular wavelength (known as the Bragg wavelength). The Bragg wavelength depends on the average or effective refractive index of the optical fiber segment and on distance between gratings of the alternating regions (i.e., the period). As is well known, the Bragg wavelength of a FBG is dependent on the temperature and the strain on the fiber segment containing the FBG.

Typically, the optical fiber segment containing the FBG is attached under strain to a package that can be mounted on a board or otherwise incorporated into a unit or assembly. As schematically illustrated in FIG. 1 (PRIOR ART), the optical fiber segment is attached to a conventional package at two attachment points, with the FBG section being between the attachment points.

In this example of a conventional package, an optical fiber 100 is attached to a package having portions 101 and 102. Optical fiber 100 is attached under strain to portions 101 and 102 using bonds 103 and 104. Bonds 103 and 104 are commonly solder, epoxy or other adhesive. A FBG (or other photonic device) can be implemented in the portion of optical fiber 100 between bonds 103 and 104. A screw 105 can be adjusted to vary the length between bonds 103 and 104, thereby adjusting the strain on the portion of optical fiber 100 between bonds 103 and 104. Precise control of the dimensions of the package and the length of the optical fiber between bonds 103 and 104 are needed to achieve the desired temperature compensation of the package.

As seen in FIG. 1, bonds 103 and 104 are relatively large so that optical fiber 100 is reliably attached to the athermal package. However, this relatively large size makes it difficult to determine the exact attachment point of optical fiber 100 to bond 103 (and bond 104) and tends to cause the exact attachment point to vary from bond to bond. As previously described, precise control of the length of the portion of optical fiber 100 between bonds 103 and 104 is needed to achieve the desired temperature compensation. Thus, the relatively large size of bonds 103 and 104 can undesirably cause variations in the performance of the athermal package.

Bonds 103 and 104 are typically implemented using adhesives (e.g. organic adhesive such as epoxy) or by soldering (e.g., glass solder or metal solder). However, organic adhesives can have reliability issues caused by ageing, temperature cycling, humidity, etc. Soldering tends to be complex (e.g., requiring the deposition of a metal on the optical fiber), which are generally undesirable in a large-scale manufacturing environment.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Embodiments of the present invention are directed to an athermal package using a collapsible ferrule at each end of an optical fiber segment. The optical fiber segment can include or contain a photonic device such as, for example, a FBG. In one embodiment, the ferrules have a tip that can be collapsed to attach the ferrule to the fiber. This mechanical attachment process is relatively simple and reliable under varying environmental conditions. Further, the collapsed tip forms a relatively short bond region on the optical fiber, thereby advantageously reducing variations in the effective length of the optical fiber segment between the ferrules.

In further refinement of this embodiment of the invention, first and second ferrules are disposed in recesses in first and second portions of the athermal package. The first and second portions are separated by a third portion. In some embodiments, the length of the third portion can be adjusted to adjust the strain on the optical fiber connected between the first and second ferrules.

Other embodiments of the present invention are directed to an athermal package with bonding pockets for containing an adhesive to bond an optical fiber to the athermal package. The bonding packets advantageously allow the adhesive to experience dimension changes (e.g., due to curing and/or environmental conditions) while minimizing changes in the strain on the optical fiber segment between the bonding pockets.

Although the following detailed description includes references to a FBG embodiment with two bonding regions at each end of an optical fiber segment, other embodiments can include other types of photonic devices and/or more than two bonding regions.

Figure 1:
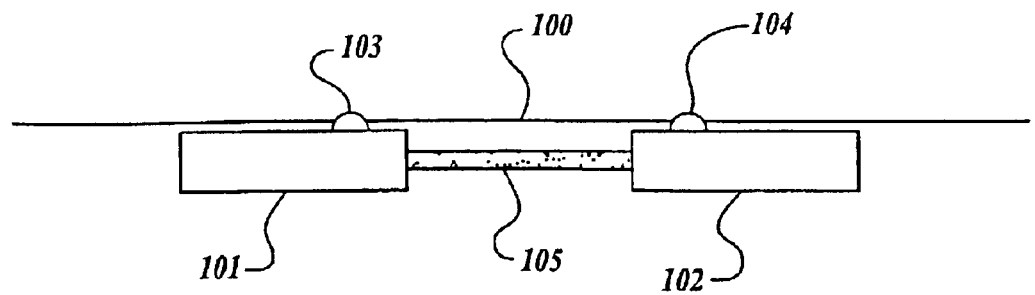
FIG. 1 is a schematic diagram illustrating a conventional athermal package for a FBG.
Figure 2:
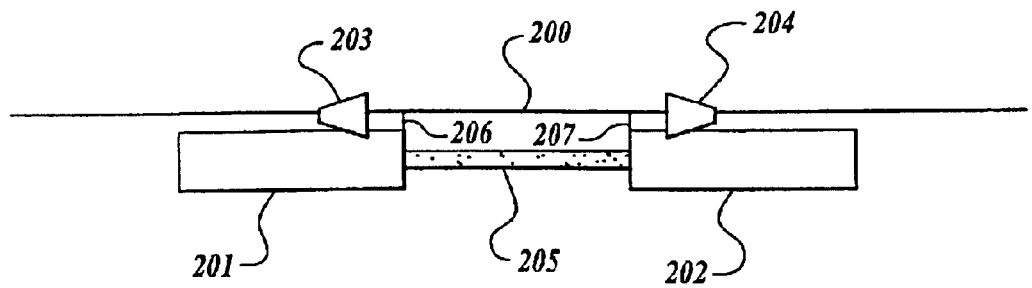
FIG. 2 is a schematic diagram illustrating an athermal package with collapsible ferrules, according to one embodiment of the present invention.

FIG. 2 schematically illustrates an athermal package for use with an optical fiber 200, according to one embodiment of the present invention. In one embodiment, optical fiber 200 includes a FBG. This embodiment of the athermal package includes ferrule portions 201 and 202, ferrules 203 and 204, and a connecting portion 205. In some embodiments, the length of portion 205 can be adjusted, for example, by a screw mechanism (not shown). Portions 201 and 202, in some embodiments, are made of one material, while portion 205 is made of another material. These materials are selected so that they have different thermal coefficients of expansion, so that temperature dependent changes in the lengths of portions 201 and 202 are offset or compensated for by an opposite change in length of portion 205. In some applications, the materials may be selected to achieve a partial compensation or an overcompensation. In other embodiments, different combinations of materials may be used to implement portions 201, 202 and 205 to achieve athermal performance.

The elements of this embodiment of the athermal package are interconnected as follows. Portion 201 has one end that is attached at or near one end of portion 205. Similarly, portion 202 has an end that is attached to the other end of portion 205. Ferrules 203 and 204 are attached to portions 201 and 202, respectively. Optical fiber 200 is disposed to run through ferrules 203 and 204, which are then collapsed to attach optical fiber 200 (under a selected strain) to the athermal package. In an FBG application, the FBG is disposed in the segment of optical fiber 200 that is located between ferrules 203 and 204.

Figure 4:
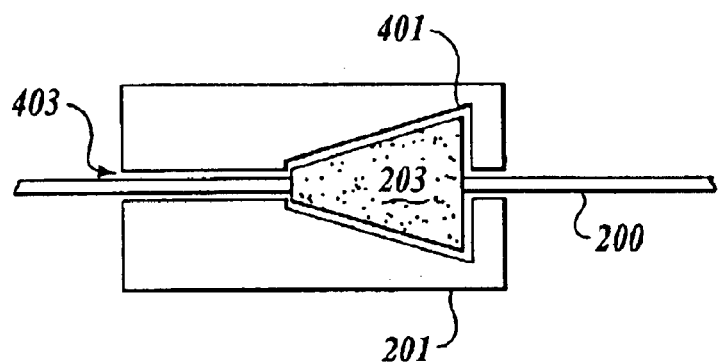
FIG. 4 is a top view illustrating the attachment of a ferrule within a recessed portion of the athermal package, according to an embodiment of the present invention.

In this embodiment, portions 201 and 202 respectively include raised portions 206 and 207 used to attach ferrules 203 and 204 that extend to just below the level of optical fiber 200. For example, portions 201 and 202 can be machined to create raised portions 206 and 207. In other embodiments, raised portions 206 and 207 may extend higher than optical fiber 200, with a hole or slot formed in the raised portions pass the optical fiber. For example, to form the raised portions, portions 201 and 202 can include recesses sized to accept ferrules 203 and 204, with a slot running longitudinally along portions 201 and 202 and through the recesses to pass optical fiber 200. For example, see FIG. 4 in which portion 201 has a recess 401 for receiving ferrule 203 and slot 403 for passing optical fiber 200. The raised portions can advantageously avoid slippage due to asymmetric forces and torque experienced by the ferrules when the optical fiber is connected to ferrules under strain.

Figure 3A:
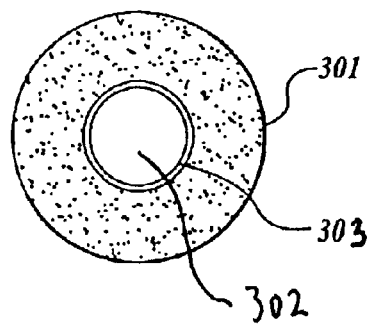
FIGS. 3A and 3B are cross-sectional diagrams illustrating attachment of an optical fiber to a collapsible ferrule, according to an embodiment of the present invention.
Figure 3B:
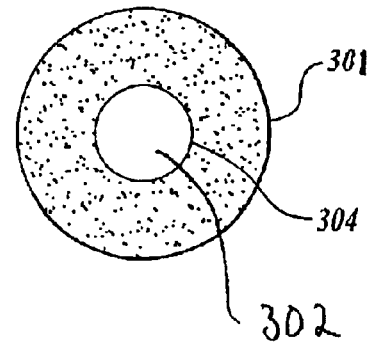

FIGS. 3A and 3B illustrate attachment of an optical fiber 302 to a collapsible ferrule 301, according to an embodiment of the present invention. In one embodiment, ferrules 203 and 204 are substantially the same as ferrule 301.

Optical fiber 302 is fitted through ferrule 301 and another substantially identical ferrule (not shown) so that the ferrules can slide along the optical fiber to desired positions. The openings in ferrules are slightly larger in diameter than that of optical fiber 302. Thus, as shown in FIG. 3A, a small gap 303 exists between the outer surface of optical fiber 302 and the inner surface at the end of ferrule 301.

Ferrule 301 is then positioned at the desired location on optical fiber 302, and then collapsed. In this embodiment, ferrule 301 is collapsed using a tool (not shown) to mechanically fix ferrule 301 to optical fiber 302 at the desired location. The collapsed ferrule 301, as illustrated in FIG. 3B, forms a tightly fitted interface 304 with optical fiber 302, eliminating gap 303 (FIG. 3A). Suitable collapsible ferrules and tools are commercially available.

In an alternative embodiment, the temperature of the ferrules is changed (significantly beyond the expected operating range) to increase the size of the opening to allow the ferrule to be fitted to the optical fiber. The ferrule opening then returns to its normal size (selected to be slightly smaller than the diameter of the optical fiber) when the temperature returns to the expected operating range, thereby securely attaching the ferrule to the optical fiber. In other embodiments, different attachment mechanisms can be used.

The second ferrule (not shown) is positioned along optical fiber 302 and fixedly attached by collapsing the ferrule as described above for ferrule 301. The ferrules (and thus optical fiber 302) are attached to portions of an athermal package (similar to portions 201 and 202 of FIG. 2). In this embodiment, the athermal package can adjust the distance between the ferrules to achieve a desired strain on the segment of optical fiber 301 between the ferrules. In one exemplary embodiment, optical fiber 302 is loaded to experience a strain of about 800–1000 microstrains when the temperature is at the lowest end of the expected or specified operating temperature.

These embodiments are advantageous over conventional adhesive and soldering bonding in that the collapsible ferrules can provide a relatively simple (i.e., in the attachment operation) and reliable optical fiber attachment mechanism. For example, similar collapsible ferrules have been used in field replaceable connector applications, meeting various specifications (including military standards) for reliability. In addition, the attachment process can be faster in that once the ferrules are collapsed, there is no "curing" period as in conventional adhesive bonds.

In addition, the physical attachment region of the ferrule on the optical fiber can be significantly less than conventional adhesive and solder bonds. As previously described, precise control of the length of the portion of optical fiber between the bonding mechanisms is needed to achieve the desired temperature compensation. Thus, the relatively small effective attachment regions of the ferrules can advantageously reduce variations in the performance of the athermal package compared to conventional adhesive and solder bonds.

In another embodiment of the present invention, an athermal package 500 that is similar to the athermal package of FIG. 2 except that adhesive disposed in pockets are used to attach optical fiber 200 to the athermal package instead of ferrules. As will be described in more detail below, this embodiment advantageously reduces changes in strain on the segment of optical fiber 200 between the adhesive bonds that may be caused by environmental changes. It is believed that heretofore that the effect of environmental changes on the size and physical shape of adhesives used in adhesive bonds have neither been appreciated nor accounted for in designing athermal packages. For example, increases in temperature and/or humidity tend to cause adhesives to swell or expand. Conversely, the curing process and decreases in temperature and/or humidity tend to cause adhesives to shrink or contract. If the dimensions of the adhesive bonds are unconstrained, the volume of the bonds can change with these environmental conditions (and the curing process), thereby changing the strain on the segment of optical fiber between the bonds. In many applications, this effect is undesirable. This effect is addressed and compensated for in athermal package 500.

Figure 5:
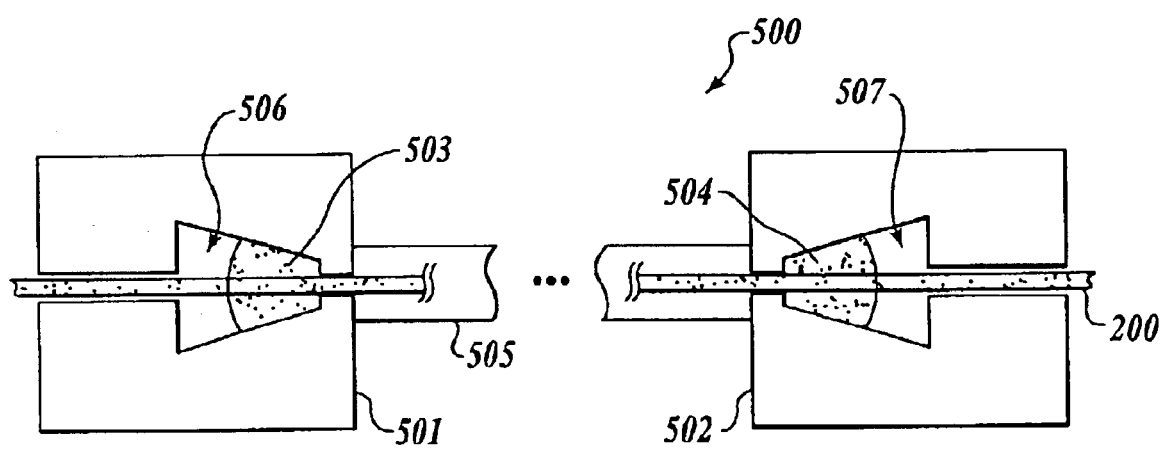
FIG. 5 is a top view illustrating a bonding pocket formed in a portion of an athermal package, according to an embodiment of the present invention.

In the embodiment of FIG. 5, athermal package 500 includes portions 501 and 502 with adhesive bonds 503 and 504, respectively. Portions 501 and 502 have pockets 506 and 507, respectively, in which adhesive bonds 503 and 504 are formed. In some embodiments, pockets 506 and 507 are conical (with a truncated tip) in shape, with optical fiber 200 to be co-axial with the longitudinal axis of the pocket. In other embodiments, the pockets may have different shapes or geometries. For example, the pockets can be relatively narrow at one end and relatively wide at an opposite end (e.g., a wedge-shape). The geometry of the pockets can be designed to match the expansion/contraction properties of the adhesive.

In this embodiment, adhesive bonds 503 and 504 do not completely fill pockets 506 and 507, respectively. Rather, the adhesive bonds are disposed in contact the "narrow" end of the pockets without touching the wide end. As can be seen in FIG. 5, the adhesive material is constrained by pockets 506 and 507 so that any changes in dimension in adhesive bonds 503 and 504 can only occur toward the wide ends of pockets 506 and 507, respectively. In this embodiment, the segment of optical fiber 200 to have a controlled strain is between the narrow ends of pockets 506 and 507. Thus, in this particular embodiment, the wide ends in effect define the starting points of "unstrained" segments of optical fiber 200.

In other embodiments (not shown), four adhesive bonds may be used (a pair at each end), so that the fiber segment between a pair of adhesive bonds may also be under strain, while the segment between the pairs has a controlled strain as described above.

In operation, changes in dimension of adhesive bonds 503 and 504 are generally along the longitudinal axis of pockets 506 and 507. This is especially true at the narrow ends of the pockets (i.e., near the controlled strain segment of optical fiber 200). Thus, dimensional changes of the adhesive material at the critical narrow end are in effect eliminated due to the geometry of the pocket. Rather, the adhesive material generally changes dimension along the longitudinal axis at the wide ends of pockets 506 and 507. The forces that would otherwise be exerted on optical fiber 200 tend to be dissipated at the exposed surface of adhesive bonds (i.e., at the wide end of the pockets). Thus, the strain on the segment of optical fiber 200 between adhesive bonds 503 and 504 is substantially (and advantageously) unchanged in response to dimensional changes in the adhesive material caused by the curing process and environmental changes (e.g., temperature, humidity, pressure, etc.).

Figure 6A:
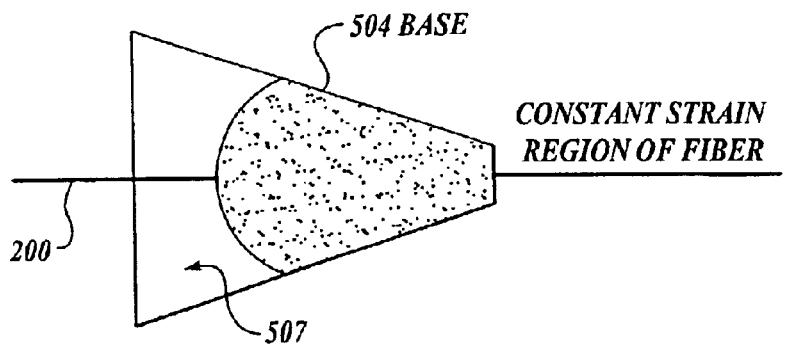
FIGS. 6A, 6B and 6C illustrate dimensional changes of the adhesive in the bonding pocket caused by environmental changes.
Figure 6B:
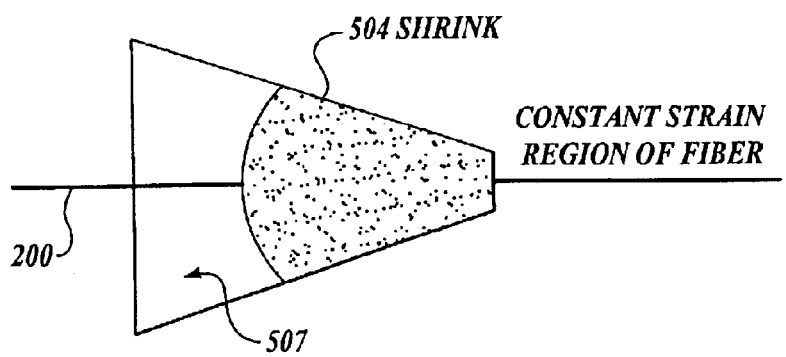
Figure 6C:
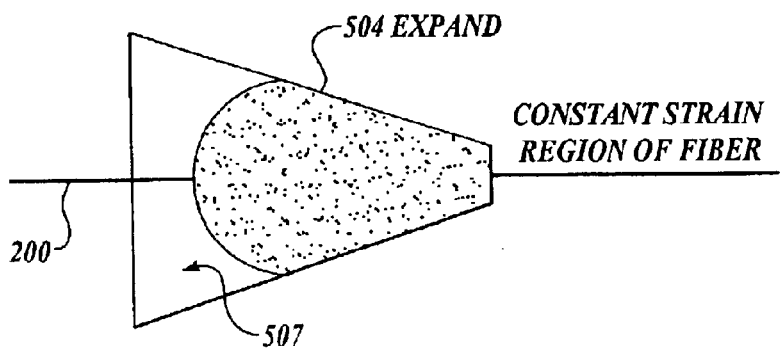

FIGS. 6A–6C illustrate how athermal package 500 responds to changes in dimension (i.e., volume) of the adhesive material. For example, FIG. 6A illustrates the size and shape of a "baseline" adhesive bond $504_{BASE}$ in pocket 507 (FIG. 5). FIG. 6B illustrates how the adhesive bond shrinks (e.g., due to curing or to a decrease in temperature or humidity), as shown by "shrunken" adhesive bond $504_{SHRINK}$. FIG. 6C illustrates how the adhesive bond expands (e.g., due to an increase in temperature or humidity), as shown by "expanded" adhesive bond $504_{EXPAND}$. As previously described, the physical confinement at the narrow end of pocket 507 prevents the adhesive from changing its size and shape at the narrow end of the bond. The constant geometry of the adhesive at the narrow end helps keep the strain on the segment of optical fiber between bonds 506 and 507 substantially constant in response to changes in the dimensions of the adhesive (e.g., due to the environment or curing).

Figure 7:
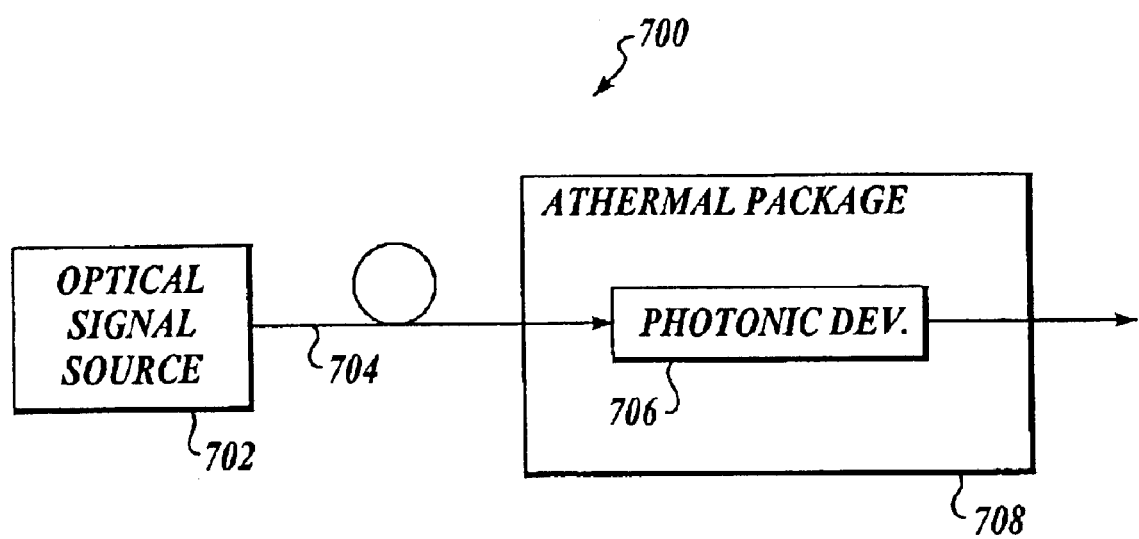
FIG. 7 is a block diagram illustrating an optical system using an althermal package according to the present invention.

FIG. 7 is included to illustrate an exemplary optical system 700 that can use an athermal package according to an embodiment of the present invention. In this embodiment, optical system 700 includes an optical signal source 702, an optical fiber 704, a photonic device 706 coupled to one end of optical fiber 704, and an athermal package 708 attached to photonic device 706. Photonic device 706 can also be coupled to one or more other elements (not shown) of optical system 700.

Optical system 700, in this embodiment, is a wavelength division multiplexed (WDM) system and photonic device 706 is a fiber Bragg grating. In one embodiment, photonic device 706 is implemented in a section of optical fiber 704. In other embodiments, photonic device 706 can be spliced onto an end of optical fiber 704. Athermal package 708 is substantially similar to the embodiments described above in conjunction with FIG. 2 or 5.

In operation, optical signal source 702 can provide an optical signal to photonic device 706 via optical fiber 704. Photonic device 706 operates on the optical signal (e.g., filters out a wavelength component of the optical signal) and provides the operated signal to one or more other elements of system 700 as in known WDM systems. As previously described, athermal package 708 (e.g., according to FIG. 2 or 5) can be more easily/accurately fabricated with the desired temperature compensation and high reliability, compared to conventional athermal packages.

Embodiments of method and apparatus for an athermal package for photonic devices are described herein. In the above description, numerous specific details are set forth (such as the sizes, shapes and materials of various portions of the athermal package) to provide a thorough understanding of embodiments of the invention. One of ordinary skill in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus comprising:
    a package attachable to an optical fiber segment that includes a photonic device between first and second points on the optical fiber segment, the package having:

a first pocket having a narrow end and a wide end;

a first bond disposed in the first pocket and contacting the narrow end of the first pocket, the first bond to attach the first point of the optical fiber segment to the package proximate the narrow end of the first pocket;

a second pocket having a narrow end and a wide end; and a second bond disposed in the second pocket and contacting the narrow end of the second pocket, the second bond to attach the second point of the optical fiber segment to the package proximate the narrow end of the second pocket.

2. The apparatus of claim 1 wherein the first and second pockets are substantially conical in shape.

3. The apparatus of claim 1 wherein the narrow ends of the first and second pockets face each other.

4. The apparatus of claim 1 wherein the first and second bonds include adhesive material.

5. The apparatus of claim 4 wherein the adhesive material does not contact the wide ends of the first and second pockets.

6. The apparatus of claim 4 wherein the first and second pockets have geometries selected in response to the adhesive material's expansion properties.

7. A system, comprising:

an optical signal source;

an optical fiber coupled to the optical signal source; and a photonic device coupled to the optical fiber, wherein the photonic device is implemented between first and second points of a segment of optical fiber, the photonic device including a package attached to the optical fiber segment between the first and second points, the package having:

a first pocket having a narrow end and a wide end;

a first bond disposed in the first pocket and contacting the narrow end of the first pocket, the first bond to attach the first point of the optical fiber segment to the package proximate the narrow end of the first pocket;

a second pocket having a narrow end and a wide end; and a second bond disposed in the second pocket and contacting the narrow end of the second pocket, the second bond to attach the second point of the optical fiber segment to the package proximate the narrow end of the second pocket.

8. The system of claim 7 wherein the first and second pockets are substantially conical in shape and the narrow ends of the first and second pockets face each other.

9. The system of claim 7 wherein the package is an athermal package.

10. The system of claim 7 wherein the first and second bonds include adhesive material, and wherein the adhesive material does not contact the wide ends of the first and second pockets.

11. The system of claim 10 wherein the first and second pockets have geometries selected in response to the adhesive material's expansion properties.

12. A method, comprising fitting a first pocket to a first point on an optical fiber, the optical fiber including a photonic device between the first point and a second point on the optical fiber, the first pocket having a narrow end and a wide end;

disposing a first bond in the first pocket, the first bond contacting the narrow end of the first pocket, the first bond attaching the first point on the optical fiber to an athermal package proximate to the narrow end of the first pocket;

fitting a second pocket to the second point on the optical fiber, the second pocket having a narrow end and a wide end; and disposing a second bond in the second pocket, the second bond contacting the narrow end of the second pocket, the second bond attaching the second point on the optical fiber to the athermal package proximate to the narrow end of the second pocket.

13. The method of claim 12, wherein the athermal package further comprises first, second, and third portions, the third portion connected to the first and second portions, and the first and second bonds are fixedly attached to the first and second portions.

14. The method of claim 12, further comprising adjusting a length of the third portion to adjust a strain on the optical fiber.

15. The method of claim 12, wherein the photonic device comprises a fiber Bragg grating (FBG).

* * * * *